United States Patent
Noh (10) Patent No.: US 8,130,085 B2
(45) Date of Patent: Mar. 6, 2012

(54) POWER LINE COMMUNICATION APPARATUS, AND METHOD AND APPARATUS FOR CONTROLLING ELECTRIC DEVICES

(75) Inventor: Si Chung Noh, Gyeonggi-do (KR)

(73) Assignee: FEELUX Co., Ltd., Kyonggi-do (KR)

( * ) Notice: Subject to any disclaimer, the term of this patent is extended or adjusted under 35 U.S.C. 154(b) by 963 days.

(21) Appl. No.: 12/151,838

(22) Filed: May 8, 2008

(65) Prior Publication Data

US 2008/0278296 A1    Nov. 13, 2008

(30) Foreign Application Priority Data

May 8, 2007 (KR) .................... 10-2007-0044666
Feb. 25, 2008 (KR) .................... 10-2008-0016968

(51) Int. Cl.
G05B 11/01 (2006.01)
G08C 19/16 (2006.01)

(52) U.S. Cl. ............ 340/12.32; 340/3.1; 340/3.21; 340/3.32; 340/3.5; 340/3.54; 340/12.37; 340/13.32

(58) Field of Classification Search .......... 340/3.1, 340/3.21, 3.32, 3.5, 3.54, 5.38, 12.32, 12.37, 340/13.32, 12.35
See application file for complete search history.

(56) References Cited

U.S. PATENT DOCUMENTS

| 2,879,453 | A | * | 3/1959 | Hodges et al. ............... 361/68 |
| 3,346,874 | A | * | 10/1967 | Howell ........................ 327/397 |
| 3,441,860 | A | * | 4/1969 | Frazer et al. ................. 327/63 |
| 3,482,396 | A | * | 12/1969 | Green et al. ................ 60/39.281 |
| 3,790,957 | A | * | 2/1974 | Dukes et al. ................. 340/5.6 |
| 3,925,763 | A | * | 12/1975 | Wadhwani et al. ........... 340/538 |
| 3,988,618 | A | * | 10/1976 | Munden et al. .............. 327/266 |
| 4,001,537 | A | * | 1/1977 | Burke et al. .................. 219/715 |
| 4,038,592 | A | * | 7/1977 | Stummer ...................... 363/165 |
| 4,040,046 | A | * | 8/1977 | Long et al. .................. 340/870.02 |
| 4,060,735 | A | * | 11/1977 | Pascucci et al. .............. 307/3 |
| 4,348,668 | A | * | 9/1982 | Gurr et al. .................. 340/3.32 |
| 4,419,665 | A | * | 12/1983 | Gurr et al. .................. 340/3.21 |
| 4,419,667 | A | * | 12/1983 | Gurr et al. .................. 340/3.1 |
| 4,745,627 | A | * | 5/1988 | Gubser ........................ 329/302 |
| 5,072,315 | A | * | 12/1991 | Tsunashima ................. 386/201 |
| 5,513,089 | A | * | 4/1996 | Sudo et al. .................. 363/21.11 |
| 5,548,203 | A | * | 8/1996 | Kemerer et al. .............. 323/210 |
| 5,672,950 | A | * | 9/1997 | Kemp et al. .................. 318/801 |
| 5,746,268 | A | * | 5/1998 | Fujisaki et al. .............. 164/468 |
| 5,754,045 | A | * | 5/1998 | Higuchi ....................... 323/320 |

(Continued)

FOREIGN PATENT DOCUMENTS

DE    4313186 A1 * 10/1993

(Continued)

*Primary Examiner* — George Bugg
*Assistant Examiner* — Paul Obiniyi
(74) *Attorney, Agent, or Firm* — The PL Law Group, PLLC (57) ABSTRACT

A power line communication apparatus, device control apparatus, and device control method are disclosed. By controlling the phase of AC power with reference to a zero cross point during power line communication, the power line communication apparatus enables not only data to be transmitted and received in a manner robust against noise and impedance but also the receiving end to be miniaturized. The power and operation of household devices can be controlled through the power line communication apparatus, thereby eliminating the need for separate communication networks when a remote control system is built in the home.

6 Claims, 9 Drawing Sheets

U.S. PATENT DOCUMENTS

| | | | | |
|---|---|---|---|---|
| 6,396,393 B2 * | 5/2002 | Yuasa | | 375/260 |
| 6,750,781 B1 * | 6/2004 | Kim | | 340/12.32 |
| 6,950,010 B2 * | 9/2005 | Aisa | | 340/12.37 |
| 7,023,324 B2 * | 4/2006 | Kodama et al. | | 375/260 |
| 7,265,654 B1 * | 9/2007 | Lester | | 340/12.33 |
| 7,405,652 B2 * | 7/2008 | Hair et al. | | 340/538 |
| 7,498,935 B2 * | 3/2009 | Kodama et al. | | 340/538 |
| 7,514,813 B2 * | 4/2009 | McKelvey et al. | | 307/32 |
| 7,734,263 B2 * | 6/2010 | Maeda et al. | | 455/127.1 |
| 7,756,650 B2 * | 7/2010 | Ackermann et al. | | 702/57 |
| 7,800,491 B2 * | 9/2010 | Kodama et al. | | 375/260 |
| 2001/0008391 A1 * | 7/2001 | Yuasa | | 340/310.01 |
| 2003/0156014 A1 * | 8/2003 | Kodama et al. | | 340/310.01 |
| 2006/0076830 A1 * | 4/2006 | Hair et al. | | 307/1 |
| 2006/0203897 A1 * | 9/2006 | Kodama et al. | | 375/219 |
| 2007/0230498 A1 * | 10/2007 | Fujiwara et al. | | 370/442 |
| 2007/0297530 A1 * | 12/2007 | Maeda et al. | | 375/295 |
| 2008/0075177 A1 * | 3/2008 | Noh | | 375/258 |
| 2008/0108379 A1 * | 5/2008 | Cho et al. | | 455/522 |
| 2009/0135932 A1 * | 5/2009 | Kodama et al. | | 375/260 |
| 2010/0322322 A1 * | 12/2010 | Kodama et al. | | 375/257 |
| 2011/0049997 A1 * | 3/2011 | Urano | | 307/104 |

FOREIGN PATENT DOCUMENTS

| | | | | |
|---|---|---|---|---|
| JP | 54129457 A | * | 10/1979 | |
| JP | 56001633 A | * | 1/1981 | |
| JP | 62269073 A | * | 11/1987 | |
| JP | 04213991 A | * | 8/1992 | |
| JP | 10042454 A | * | 2/1998 | |
| JP | 2002373389 A | * | 12/2002 | |
| JP | 2004103385 A | * | 4/2004 | |

* cited by examiner

POWER LINE COMMUNICATION APPARATUS, AND METHOD AND APPARATUS FOR CONTROLLING ELECTRIC DEVICES

CROSS REFERENCE TO RELATED APPLICATIONS

This application claims the benefit of Korean Patent Application No. 10-2007-0044666, filed on May 8, 2007 and Korean Patent Application No. 10-2008-0016968, filed on Feb. 25, 2008, which is incorporated by reference herein for any purpose.

FIELD OF THE INVENTION

The present invention relates to a power line communication apparatus and a method and apparatus for controlling electric devices. More particularly, the present invention relates to a power line communication apparatus that controls the phase of alternating current (AC) power with reference to a zero cross point of the AC power to transmit and receive data. Further, the present invention relates to a method and apparatus for controlling power and operation of electric devices with the power line communication apparatus.

DESCRIPTION OF THE RELATED ART

Generally, power line communication refers to a communication scheme that employs 110/220V power lines carrying alternating current (AC) power as communication paths, and has an advantage of enabling intercommunication between communication terminal devices without the need for separate transmission lines.

Power line communication has been utilized in various applications, such as construction of communication networks including local area networks (LAN) for short-range data transmission, control of various devices, telemetry of power, water and gas, and transmission of measurement signals.

To use power lines as communication channels, many studies have been conducted on transmission characteristics of power lines based on Frequency-Shift Keying (FSK) or Phase-Shift Keying (PSK), and FSK or PSK-based appliances have been used in practice.

Frequency bands, such as a CENELEC band of 3-148.5 kHz, FCC band of 9-450 kHz and a relatively wide band of 2-30 mHz, are generally used for power line communication.

The CENELEC and FCC bands are relatively narrow bands and are used for low-speed control communication. In these bands, although signal attenuation caused by line impedance is low, device noise is high due to low frequencies.

The relatively wide band of 2-30 mHz is used for high-speed data communication. In this band, although device noise is not so high, signal attenuation is high due to high frequencies.

As such, because of an especially noisy environment caused by various types of devices connected to power lines, the reliability of communication in power line communication is low.

That is, in conventional power line communication, high noise levels of power lines carrying electric power, household wiring conditions, and operations and changes of various loads lead to wide variation in impedance which is a line constant. As a result, signal attenuation levels and noise patterns vary depending on frequency bands, resulting in low reliability of signal transmission.

With home automation, household devices including home appliances, electric heaters and light fixtures, windows, and front doors can be controlled remotely from the home. In the home, the operation of various household devices can be controlled using a single remote controller.

Therefore, the household devices have to use an independent communication protocol to communicate with the remote controller, and a network for communication has to be installed within the home.

The household devices generally use domestic AC power as a power source, and the use of a power line communication apparatus enables intercommunication between communication terminal devices without the need for separate transmission lines, thereby facilitating construction of home automation.

SUMMARY

Consistently with some embodiments of the present invention, a power line communication apparatus includes: a transmission unit controlling a phase of AC power carried by the power line with reference to a zero cross point of the AC power to transmit input data through the power line; and a reception unit detecting a phase change in the AC power with reference to the zero cross point of the AC power to receive and output the data.

The transmission unit may include: a first zero-crossing detector detecting the zero cross point of the AC power; a phase controller controlling an output of the AC power to control the phase of the AC power; and a transmission controller controlling the phase controller according to the input data with reference to the zero cross point detected by the first zero-crossing detector to transmit the data. The phase controller may include at least one of a silicon-controlled rectifier and a Triode AC switch (TRIAC).

The transmission unit may control the phase of the AC power by turning off the AC power with reference to the zero cross point for a preset duration to cut the phase of the AC power such that the AC power with a shifted phase is output. The preset duration may be at least one of a first half cycle and a second half cycle of the AC power. Alternatively, the preset duration may be less than a half cycle of the AC power. The preset duration may be less than a half cycle of the AC power, and may be between a $1/16$ cycle and a $1/4$ cycle of the AC power.

The reception unit may include: a second zero-crossing detector detecting the zero cross point of the AC power; a comparator detecting the phase of the AC power with reference to the zero cross point detected by the second zero-crossing detector; and a reception controller receiving and outputting the data according to an output from the comparator.

Consistently with some embodiments of the present invention, a device control apparatus includes: a power control unit generating a control message to control a device connected to a power line according to a user selection, and generating a power control message including device address information and a control command by controlling a phase of AC power carried by the power line; and a plurality of the devices, each performing an operation according to the control command of the power control message in response to the power control message addressed thereto.

Consistently with some embodiments of the present invention, a device control apparatus includes: a remote controller for generating a control message to control a device connected to a power line according to a user selection; and a power control unit analyzing the control message from the remote controller and generating a power control message including device address information and a control command by controlling a phase of AC power carried by the power line; and a plurality of the devices, each performing an operation according to the control command of the power control message in response to the power control message addressed thereto.

The power control unit may include: a zero-crossing detector detecting a zero cross point of the AC power; a controller analyzing the control message and outputting a power control signal in a manner synchronized with output of the zero-crossing detector, the power control signal including device selection information for power control and operation control information for a selected device; and a phase controller controlling the phase of the AC power carried by the power line according to the power control signal to output the power control message to the power line. The phase controller of the power control unit may include a silicon-controlled rectifier. The remote controller and power control unit may further include a wireless communication unit, which is preferably A ZigBee communication unit. The remote controller may further include a communication interface and generates the control message according to a device control command received through a communication channel.

The power control message may include: start information indicating initiation of the power control message; device address information indicating a device to be controlled; a control command controlling an operation of the device to be controlled; and end information indicating the end of the power control message.

Each device may include: a delayer delaying the phase of the AC power carried by the power line; a comparator comparing the AC power phase-delayed by the delayer to a normal-phase AC power; and a controller analyzing an output from the comparator to detect the power control message and controlling an operation of the device according to the control command of the power control message in response to the device address information of the detected power control message addressed to the device.

The power control unit may generate the power control message by phase-controlling at least one of a positive-polarity half cycle and a negative-polarity half cycle of a cycle in the AC power.

The power control unit may generate the power control message by controlling the phase of the AC power for a duration less than a half cycle. More preferably, the duration less than a half cycle is between a 1/16 cycle and a 1/4 cycle of the AC power.

Consistently with some embodiments of the present invention, a device control method includes: generating a control message to control a device connected to a power line according to a user selection; generating a power control message including device address information and a control command by analyzing the control message and controlling a phase of AC power carried by the power line; and analyzing the power control message in a plurality of the devices connected to the power line, followed by allowing an associated device to perform an operation according to the control command of the power control message in response to the device address information of the power control message addressed thereto.

The generating of the power control message may include: analyzing the control message and synchronizing a power control signal with a zero-cross detection signal, the power control signal including device selection information for power control and control information for a selected device; and outputting the power control message to the power line by controlling the phase of the AC power carried by the power line according to the power control signal.

The power control message may include: start information indicating initiation of the power control message; device address information indicating a device to be controlled; a control command controlling an operation of the device to be controlled; and end information indicating the end of the power control message.

The analyzing of the power control message may include: delaying the phase of the AC power carried by the power line; comparing the phase-delayed AC power to a normal-phase AC power; and determining whether the power control message has been generated through analysis of the comparison result, followed by performing the operation by the associated device according to the control command of the power control message in response to the device address information of the power control message addressed thereto.

The power control message may be generated by phase-controlling at least one of a positive-polarity half cycle and a negative-polarity half cycle of a cycle in the AC power.

The power control message may be generated by controlling the phase of the AC power for a duration less than a half cycle. More preferably, the duration less than a half cycle is between a 1/16 cycle and a 1/4 cycle of the AC power.

BRIEF DESCRIPTION OF THE DRAWINGS

The above and other features and advantages of the present invention will become apparent from the following description of exemplary embodiments given in conjunction with the accompanying drawings, in which.

DETAILED DESCRIPTION OF THE INVENTION

Exemplary embodiments of the present invention are described in detail with reference to the accompanying drawings hereinafter. Herein, the drawings may be exaggerated in thickness of lines or scale of components for the purpose of descriptive convenience and clarity only. Furthermore, terms used herein should be defined in consideration of functions of components of the present invention and thus can be changed according to the custom or intention of users or operators.

Therefore, definition of such terms should be determined according to overall disclosures set forth herein.

Some embodiments of the present invention solve the problems of the conventional techniques as described in the description of Related Art. Consistently with embodiments of the present invention, a power line communication apparatus that controls the phase of AC power with reference to a zero cross point to transmit and receive data in a manner robust against noise and impedance is presented.

Some embodiments of the present invention can provide a power line communication apparatus that can receive data by detecting a phase change in AC power with reference to a zero cross point, thereby dramatically reducing the size of a receiver.

Some embodiments of the present invention can provide a device control method and apparatus for controlling power and operation of household devices through the power line communication apparatus.

Some embodiments of the present invention can provide a device control method and apparatus that permit a user to control the operation of household devices by making a call from a remote location using a telephone having a wireless communication unit for generating a remote control signal, with the power line communication apparatus connected to the household devices.

Figure 1:
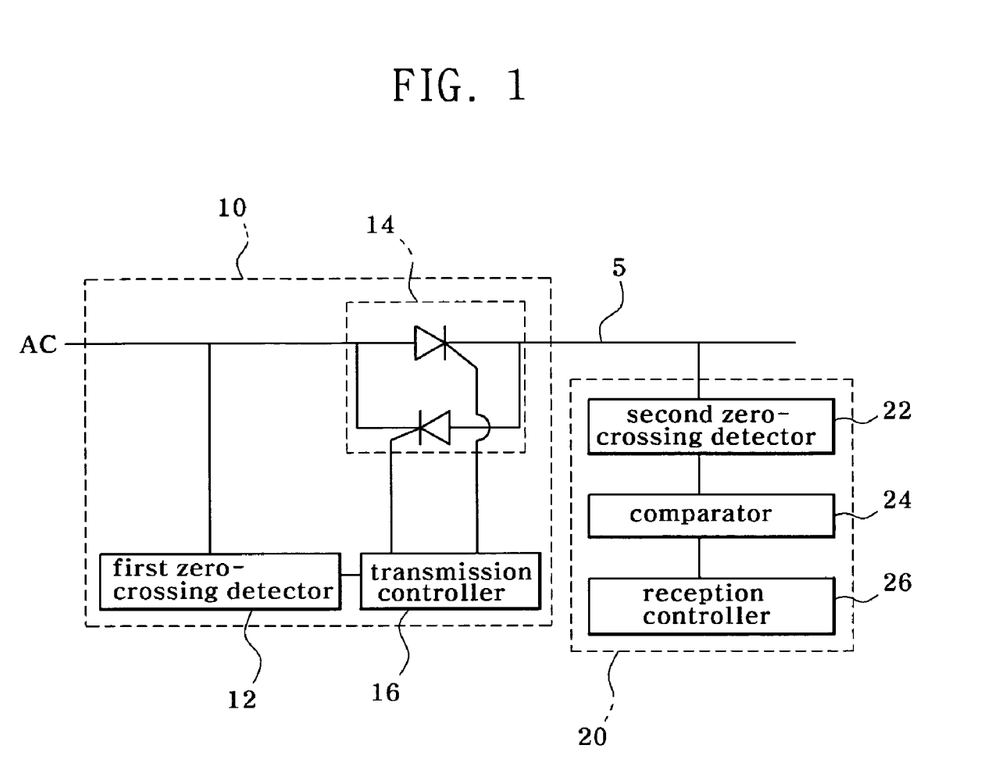
FIG. 1 illustrates a block diagram illustrating a power line communication apparatus according to some embodiments of the present invention.

FIG. 1 is a block diagram illustrating a power line communication apparatus according to one embodiment of the present invention.

Referring to FIG. 1, the power line communication apparatus includes a transmission unit 10 for controlling the phase of AC power carried by a power line 5 with reference to a zero cross point of the AC power to transmit input data through the power line 5, and a reception unit 20 for detecting a phase change in the AC power carried by the power line 5 with reference to the zero cross point to receive and output the data.

The transmission unit 10 includes a first zero-crossing detector 12 for detecting a zero cross point of the AC power, and a phase controller 14 for controlling an output of the AC power to control the phase of the AC power. The transmission unit 10 further includes a transmission controller 16 for controlling the phase controller 14 with reference to the zero cross point detected by the first zero-crossing detector 12, according to input data, for data transmission. The reception unit 20 includes a second zero-crossing detector 22 for detecting a zero cross point of the AC power, a comparator 24 for detecting the phase of the AC power with respect to zero cross points detected by the second zero-crossing detector 22, and a reception controller 26 for receiving and outputting data according to the output of the comparator 24.

The phase controller 14 includes at least one of a silicon-controlled rectifier and a TRIAC, and blocks an output of the AC power according to a control signal from the transmission controller 16 to control the phase of the AC power.

Figure 2:
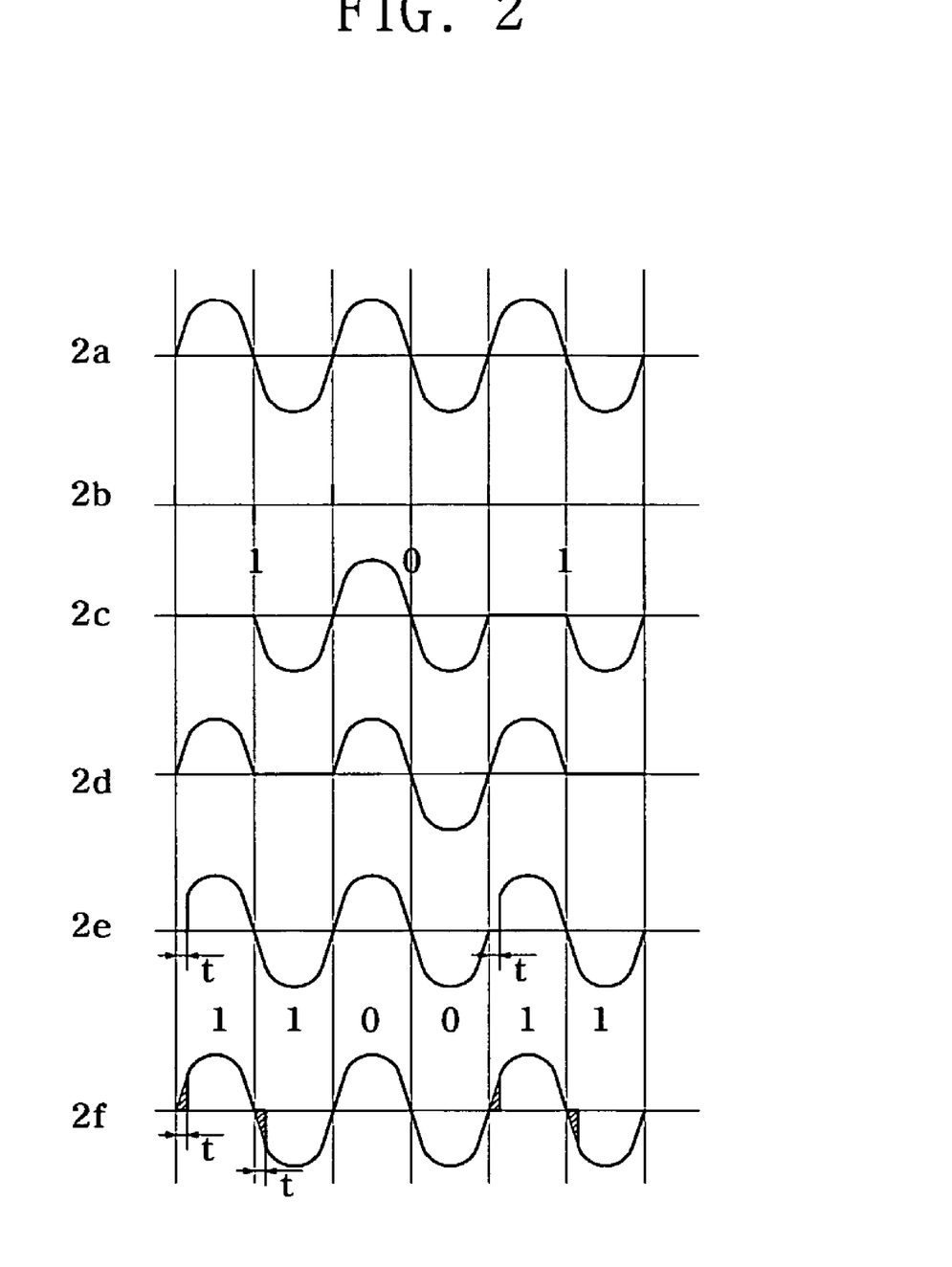
FIG. 2 illustrates examples of phase control performed by the power line communication apparatus of some embodiments of the present invention.

FIG. 2 illustrates examples of phase control performed by the power line communication apparatus of this embodiment.

Referring to FIG. 2, the phase controller 14 turns off the silicon-controlled rectifier or the TRIAC for a preset duration to cut the phase of the AC power such that the AC power with a shifted phase is output.

That is, when AC power shown by 2a of FIG. 2 is turned off with respect to a zero cross point for a first half cycle, the AC power is phase-controlled (i.e. phase-shifted) such that an upper portion of the waveform having a positive polarity is cut off as shown by 2c of FIG. 2, thereby enabling transmission of one bit of data during one cycle.

When the AC power is turned off with respect to a zero cross point for a second half cycle, the AC power is phase-shifted such that a lower portion of the waveform having a negative polarity is cut off as shown by 2d of FIG. 2, thereby enabling transmission of one bit of data during one cycle.

If either an upper portion or a lower portion of the waveform is to be controlled as described above, a single silicon-controlled rectifier may suffice for phase control.

In addition, when the AC power is turned off with respect to a zero cross point for less than one half cycle, the phase is cut at a corresponding position as shown by 2e and 2f of FIG. 2, thereby enabling both transmission of 1-2 bits of data during one cycle and reduction of power loss.

The duration to turn off the AC power can be set so that power loss can be reduced and devices connected to the power line transmitting data can operate normally.

For example, in the case where the turn-off duration is set to a 1/32 cycle (0.52 ms), stable data transmission and reception can occur in a low noise environment, whereas data reception errors may occur when the supply of power is unstable. When the turn-off duration is set to a half cycle, a related device may operate and power loss may be incurred. Hence, to reduce power loss while enabling stable data transmission and reception, it is preferable to set the turn-off duration to a range of a 1/16-1/4 cycle (1.04-4.16 ms), at which power loss is less than about 4%.

In the power line communication apparatus described above, when data is input to the transmission unit 10, the transmission controller 16 controls the phase controller 14 in a manner synchronized with the data, with reference to a zero cross point detected by the first zero-crossing detector 12, to turn off the output of the alternating current for a preset duration when transmitting the data to the power line 5. In the reception unit 20 connected to the power line 5, the comparator 24 checks the phase of the AC power and detects a phase change with reference to the zero cross point detected by the second zero-crossing detector 22 to receive data transmitted through the power line 5. If the phase change is found, the reception controller 26 restores the received data for output.

Next, a device control apparatus and device control method are described. These can be used to construct a remote control system in the home, with which the power and operation of household devices can be controlled through power line communication.

In the following description, a "control message" denotes a message that is used for controlling a device selected by the user.

A "power control signal" denotes a control signal that is output by a controller of a power control unit to control the phase of domestic AC power.

A "power control message" denotes a signal that is generated through phase control of the domestic AC power in response to a power control signal, is output to a power line by the power control unit, and is a message to control the operation of devices.

"Domestic power", "domestic AC power" and "AC power" have the same meaning and denote electric power supplied to the home.

A power control message includes start information, device address information, control command, and end information.

The "start information" indicates initiation of the power control message; the "device address information" indicates a device selected as a destination that will perform power control; the "control command" indicates a control operation to be performed by the selected device; and the "end information" indicates the end of the power control message.

Figure 3:
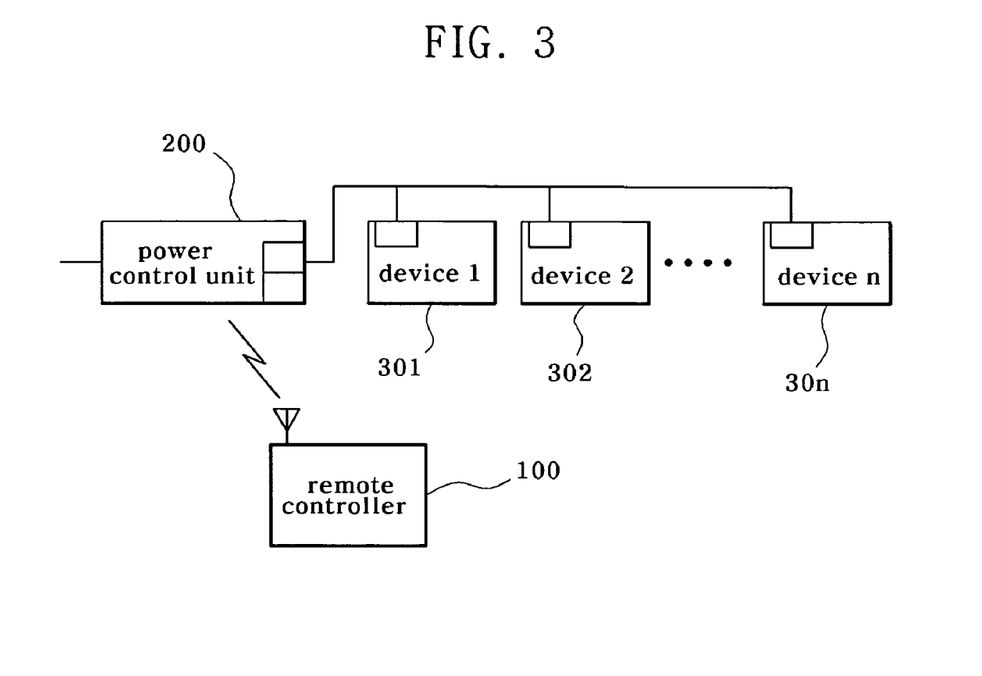
FIG. 3 is a diagram illustrating connection between household devices according to some embodiments of the present invention.
Figure 4A:
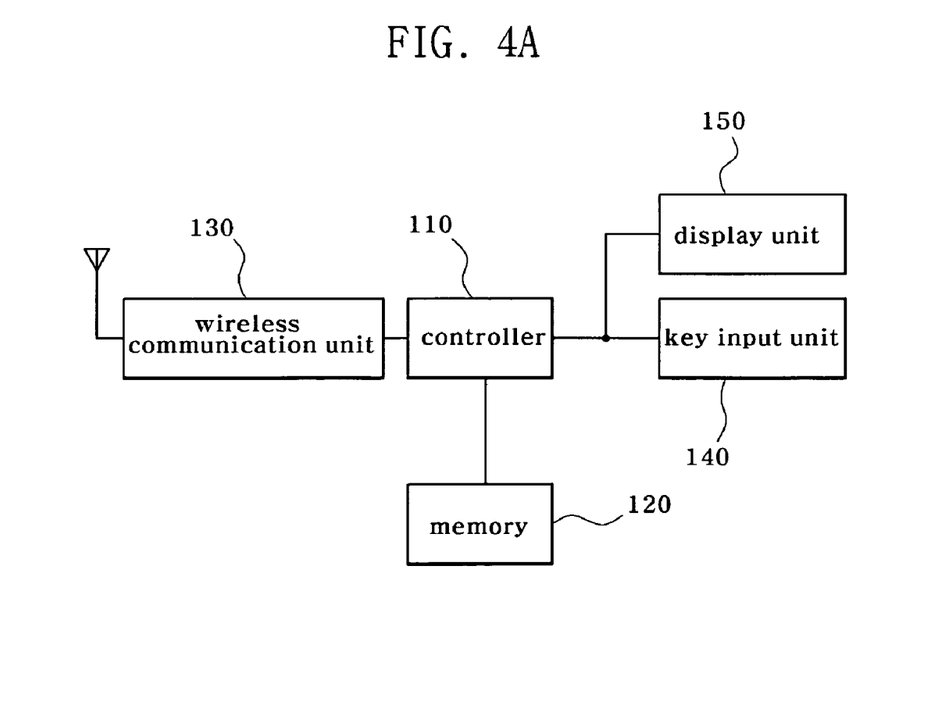
FIGS. 4a and 4b are block diagrams of a remote controller shown in FIG. 3.
Figure 4B:
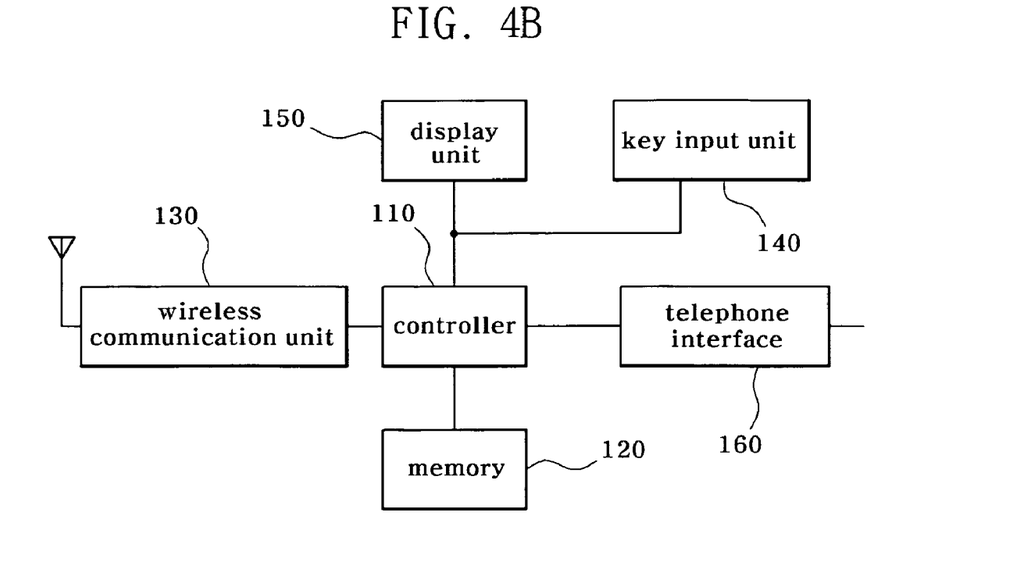

FIG. 3 is a diagram illustrating an exemplary connection between household devices according to one embodiment of the present invention, and FIGS. 4a and 4b are block diagrams of a remote controller shown in FIG. 3.

Referring to FIG. 3, and FIGS. 4a and 4b, the remote controller 100 generates a control signal to control the operation of household devices according to a user selection.

The remote controller 100 can be a standalone device like a remote controller as shown in FIG. 4a, or can be a device coupled to another communication device like a telephone as shown in FIG. 4a.

In response to a device selection command or operation control command from the user, the remote controller 100 generates and transmits a corresponding control message.

In FIG. 3, a power control unit 200 is connected to household electric power and is also connected to devices 301 to 30n through power lines. The power control unit 200 controls the household power to control the operation of the devices 301 to 30n via the remote controller 100.

The household power may be AC power. The power control unit 200 receives and analyzes a control message from the remote controller 100, and controls the phase of the household power based on the analysis result to generate a power control message for controlling the operation of the devices 301 to 30n.

The power control message includes a device address (channel address information) indicating a device, and a command (control command) for controlling the operation of the addressed device.

Each of the devices 301 to 30n uses the household power output from the power control unit 200 as operating power. When receiving a power control message, the device decodes the received power control message. If named by a device address in the message, the device analyzes a control command following the device address, and performs a requested control operation.

The devices 301 to 30n can be devices capable of performing solely a power-on/off operation (for example, powering on/off a light fixture or electric rice-cooker), devices operable stepwise using a motor or the like (for example, an electric curtain controller), or devices both capable of performing a power-on/off operation and operable stepwise (for example, a light fixture operable in multiple brightness levels, color temperatures, or color rendering indexes).

Hence, control commands for the devices 301 to 30n may have different formats according to their device characteristics, and must be preprogrammed.

Next, the configuration and operation of the remote controller 100 in FIG. 3 will be described.

Referring to FIG. 4a, a key input unit 140 can generate a command to select one of the devices 301 to 30n according to a user selection, and a command to control the operation of the selected device.

A display unit 150 can display a control command under the control of a controller 110 according to user settings.

A memory 120 can store programs and associated data to process selection of a household device and to handle an operation control command according to an embodiment of the present invention.

The controller 110 analyzes a remote control command from the key input unit 140, and generates a control message to control the operation of the corresponding household device.

A wireless communication unit 130 converts a control message from the controller 110 into data in a format conforming to a preset wireless communication scheme, and outputs the data.

The wireless communication unit 130 can use a communication scheme such as IrDA, Bluetooth or Zigbee.

As described above, the remote controller 100 may be a standalone device. Alternatively, as shown in FIG. 4b, the remote controller 100 may include a telephone interface 160, and be connected to an exchange through a trunk line for wired communication.

In FIG. 4b, a memory 120 can store a program for driving a telephone, and programs and associated data to process selection of a household device and to handle an operation control command according to an embodiment of the present invention.

A controller 110 analyzes information received through a telephone interface 160, and generates a control message corresponding to the remote control command to control the operation of a selected household device if a response to a remote control command is present in the received information.

A wireless communication unit 130 converts a control message from the controller 110 into data in a format conforming to a preset wireless communication scheme, and outputs the data.

A key input unit 140 includes a regular keypad for phone conversation, and can further include keys for remotely controlling the operation of household devices as described in connection with FIG. 4A.

A display unit 150 can display settings for telephone operation and remote control operation according to an embodiment of the present invention under the control of the controller 110.

When the wireless communication unit 130 uses the ZigBee communication scheme, data frames of the ZigBee standard are used between the remote controller 100 and power control unit 200.

In this case, the remote controller 100 transmits device address information (channel address) and power control command (control command) as a ZigBee data frame to the power control unit 200.

In one embodiment of the present invention, the super-frame structure of the ZigBee standard is applied. To minimize latency and reduce power consumption, a super-frame having Guaranteed Time Slots (GTS), in which predetermined time slots are used, can be applied. The super-frame can be transmitted by the remote controller 100, and can use multiple time slots including a beacon frame.

In the super-frame structure, a single remote controller 100 can allocate time slots for multiple devices 301 to 30n. When time slots for devices are allocated, each of the devices 301 to 30n receives a control command from an allocated time slot after detection of a beacon frame and analyzes the control command to perform a requested control operation.

In this embodiment, it is assumed that the time slots are not used. In this case, a frame structure comprising a beacon frame and data frame is used instead of the super-frame structure.

In the ZigBee communication, exchanged frames are referred to as information frames. Information frames exchanged between the remote controller 100 and power control unit 200 include beacon frames, data frames, acknowledgment frames, and command frames. These types of frames are the same as those specified by the ZigBee standard, and their formats also comply with the ZigBee standard.

Beacon frames are sent from the remote controller 100 for synchronization with the power control unit 200. Data or command frames are sent from the remote controller 100 to the power control unit 200 to send setting information and operation control information (power-on/off and operation step information) of the devices 301 to 30n.

When the remote controller 100 sends data to the power control unit 200, a beacon frame is sent first and a data frame or command frame is sent next.

The format of a general frame in the ZigBee standard is shown in Table 1.

TABLE 1

| Frame Control (FC) | Sequence Number (SN) | Destination Address (DA) | Source Address (SA) | Frame Payload | FCS |
|---|---|---|---|---|---|

In Table 1, the Frame Control (FC) field is used to specify the frame type, security feature setting, and addressing mode. The frame type can indicate a beacon frame, data frame, acknowledgment frame, or command frame. The Sequence Number (SN) field is used to specify the sequence number of the frame. The Destination Address (DA) field and Source Address (SA) field are used to specify the receiver address and the sender address, respectively. The frame payload field is used to store data according to the type of information frame, and can be varied in size. The Frame Check Sequence (FCS) field is used to store a Cyclic Redundancy Check (CRC) code for frame protection.

In addition, the frame payload field of a data frame can store information regarding a device to be selected and operation control information for a selected device, as shown in Table 2.

Table 2 shows an example of device selection and control commands, whose information can be stored in the payload field of a data frame for transmission, in one embodiment of the present invention. In Table 2, the device selection (device address) information can be identification information for a device to be remotely controlled, and the operation control information can be a control command to control the operation of a selected device.

TABLE 2

| device address | operation control information |
|---|---|
| device 1 | power on/off and/or operation step control |
| device 2 | power on/off and/or operation step control |
| device 3 | power on/off and/or operation step control |
| — | — |
| device n | power on/off and/or operation step control |

The key input unit 140 of the remote controller 100 of FIG. 4a or FIG. 4b may include keys to select one of the devices shown in FIG. 3 and to generate an operation control command for a selected device.

The key input unit 140 may include numeric keys or independent selection keys for selecting the devices 301 to 30n, and may further include operation control keys, which include an on/off key for power control of a device and a key for controlling the operation of a device in steps (for example, an up or down key).

Further, the user can issue a remote control command at a location outside the home using an external telephone (wired or mobile phone).

In this case, the user inputs a control code using an external telephone to inform the remote controller 100 having a configuration, as shown in FIG. 4b, of issuance of a remote control command, also inputs a number using a numeric key to select a device to be controlled, and then generates a key value associated with a preset power-on/off key and/or a key preset for operation control of a device. Then, the telephone interface 160 sends the user input to the controller 110.

The memory 120 can store a mapping table corresponding to device selection and operation control keys from the key input unit 140 and telephone interface 160.

That is, the mapping table stores corresponding mappings between device identification information and device selection signals from the key input unit 140 or the telephone interface 160, and further stores information for operation control of devices.

When a signal requesting device selection and operation control is received, the controller 110 searches a corresponding mapping table in the memory 120 to locate a selected device and operation control information as shown in Table 2, and generates a data frame using the located selected device and operation control information.

Thereafter, the controller 110 generates a data frame and a beacon frame having a format as shown in Table 1, and sends the beacon frame and data frame to the wireless communication unit 130, which then outputs the frames as a control message.

Next, the configuration and operation of the power control unit 200 of FIG. 3 will be described with reference to FIGS. 5a and 5b.

Figure 5A:
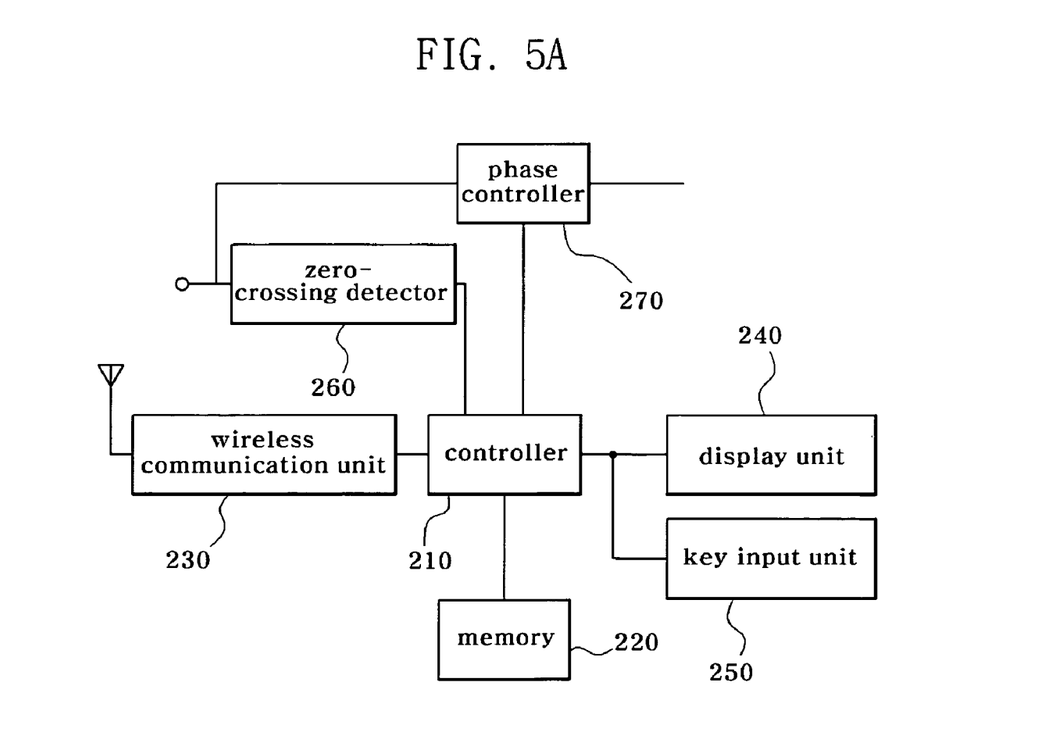
FIGS. 5a and 5b are block diagrams of a power control unit shown in FIG. 3.
Figure 5B:
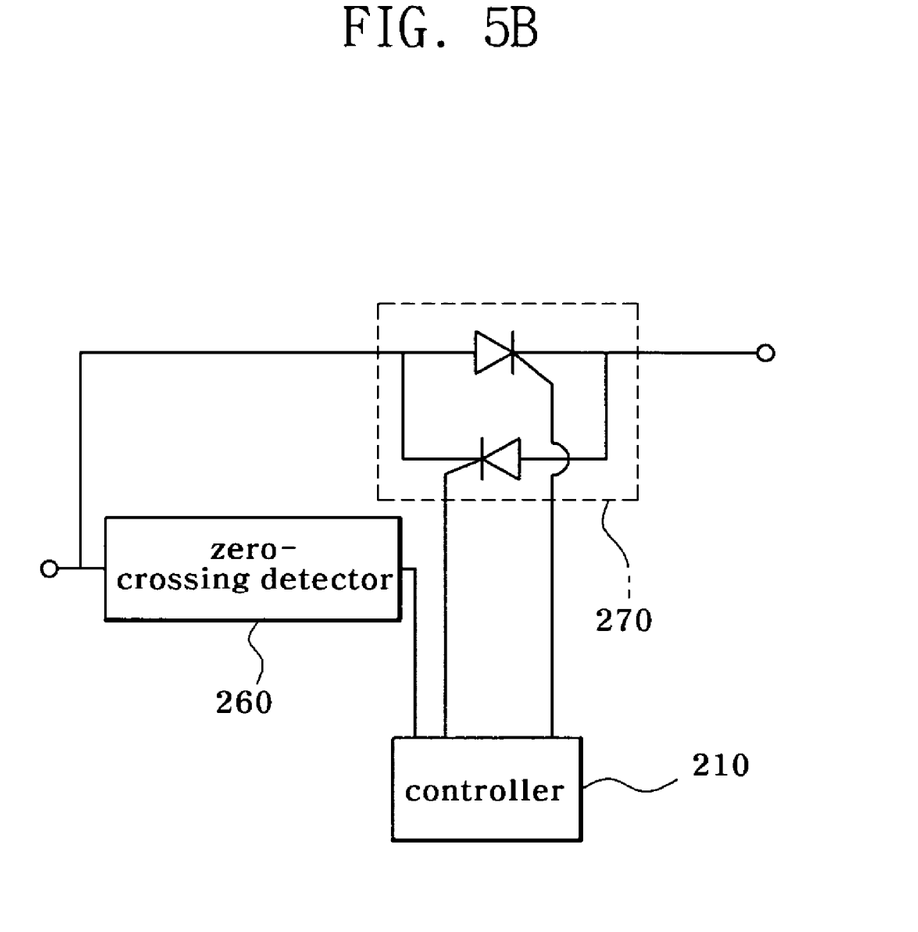

FIG. 5a illustrates the configuration of the power control unit 200, and FIG. 5b illustrates connection relations for a phase controller 270 made of the silicon-controlled rectifiers.

The power control unit 200 can be installed at the electric switchboard of the home or at a location like a living room in the home.

The power control unit 200 controls the phase of an indoor AC power supplied to drive the devices 301 to 30n so as to generate a power control message.

In FIG. 5a, a wireless communication unit 230 receives a control message from the remote controller 100.

Here, the control message may be a ZigBee compliant message.

A memory 220 may store programs to control the operation of the power control unit 200, and to control the phase of the AC power according to a received control message.

The memory 220 may further store data to be used for controlling the phase of the AC power according to a received control message.

A controller 210 analyzes a control message received through the wireless communication unit 230, and generates a power control signal that produces a power control message to control the devices 301 to 30n by changing the phase of the AC power according to the received control message.

A display unit 240 displays operation status of the power control unit 200 under the control of the controller 210.

A key input unit 250 may generate a control signal to control the operation of the devices 301 to 30n. Here, the display unit 240 and the key input unit 250 can be omitted.

A zero-crossing detector 260 is connected to the power line, and detects a zero cross point of the AC power carried by the power line and sends a zero-cross detection signal to the controller 210. The zero-crossing detector 260 generates a first zero-cross detection signal at a point in time when the AC power reverses polarity from negative to positive (phase angle of zero degrees), and generates a second zero-cross detection signal at a point in time when the AC power reverses polarity from positive to negative (phase angle of 180 degrees).

When a control message is not received through the wireless communication unit 230, the controller 210 disregards the output of the zero-crossing detector 260. When a control message is received through the wireless communication unit 230, the controller 210 analyzes the control message, and outputs a power control signal corresponding to the analysis result to a phase controller 270 in a manner synchronized with a zero-cross detection signal from the zero-crossing detector 260.

Here, the power control signal can be a signal to control the phase of the AC power.

The phase controller 270 generates a power control message to control the operation of the devices 301 to 30n by controlling the phase of the AC power according to a power control signal.

Referring to FIG. 5b, the phase controller 270 may include a current control component. The current control component is a component that can control the phase of AC power according to a control signal, and can be a silicon-controlled rectifier or TRIAC.

The silicon-controlled rectifier is an AC power control component including three electrodes of anode, cathode and gate. Once a control signal is fed to the gate electrode, the silicon-controlled rectifier continues to operate without continuous supply of gate current until reverse polarity current is fed to the main circuit or the current through the main circuit drops below a value referred to as the holding current.

The TRIAC is a bidirectional component including two silicon-controlled rectifiers, and can control AC power, in which the current polarity alternates between positive and negative.

For generation of lighting power, the phase controller 270 can be formed using a single TRIAC, or can be formed using two silicon-controlled rectifiers as shown in FIG. 5b.

When either the upper portion or lower portion of the AC waveform is to be controlled, phase control can be performed using a single silicon-controlled rectifier.

In one embodiment of the present invention, a description will be provided under the assumption that phase control is performed using a silicon-controlled rectifier.

A power control message generated by the phase controller 270 can be a portion of the AC power whose phase is controlled in a preset waveform, and is applied to the devices 301 to 30n through the power line.

A power control signal from the controller 210 of the power control unit 200 may have a format as shown in Table 3, and a power control message from the power line may also have the same format as above.

TABLE 3

| start information | device address | control command | end information |
|---|---|---|---|

In Table 3, the start information indicates the start of power control, and may be information for controlling the phase of the positive part and/or negative part of the AC power.

In this embodiment of the present invention, the start information is assumed to take 2 cycles of the AC power.

The device address information may be information for detecting the devices 301 to 30n. At this time, the device address information may also be information for controlling the phase of the positive part and/or negative part of the AC power.

The device address information may be made using the same number of cycles of the AC power as the number of devices 301 to 30n to be controlled (first scheme).

For example, when the number of devices 301 to 30n is 10, a 10-cycle interval of the domestic AC power is allocated for generating the device address information, and, each cycle of the interval in the AC power is uniquely assigned to a specific one of the devices 301 to 30n (in the 10-cycle interval, 'device 1' is assigned to the first cycle, 'device 2' to the second cycle, and 'device 10' to the tenth cycle).

This is a kind of time division multiplexing, in which the cycles of the AC power assigned to device address information are mapped to the devices 301 to 30n in one-to-one correspondence.

Alternatively, identification information of devices to be controlled can be represented digitally (second scheme).

For example, if the number of devices 301 to 30n is less than or equal to 16, 4 cycles of the AC power can used. That is, to address the first one of the devices 301 to 30n, device address information of '0000' is output and no cycle in a 4-cycle interval of the AC power allocated to device address information is phase-shifted. To address the second device, device address information of '0001' is output and the last (fourth) cycle in the 4-cycle interval is phase-shifted. To address the tenth device, device address information of '1010' is output and the first and third cycles in the 4-cycle interval are phase-shifted.

The device address information may be coded in schemes other than the two schemes described above so as to control the phase of cycles in the device address interval of the AC power.

In the embodiment of the present invention, it is assumed that the second scheme is used.

In Table 3, the control command may be command information for controlling the operation of a device set by the device address information.

As to control commands, power-on/off commands can be applied to home appliances such as light fixtures and electric rice-cookers. For appliances utilizing a motor such as an electrically driven curtain and window, commands for motor step control can be applied. For a light fixture with dimming control, commands for controlling power-on/off and brightness step can be applied.

Control commands may be information for controlling the phase of the positive part and/or negative part of the AC power.

Control command information may be represented using schemes similar to those for device address information. For example, control command information can be represented using the same number of cycles of AC power as the number of commands, or using a number of cycles of AC power sufficient to digitally code commands.

After generation of a power control signal having the above-described format, a corresponding power control message is generated by the phase controller 270 in the form described below with reference to FIG. 6, and is transmitted through the power line to the devices 301 to 30n.

Figure 6:
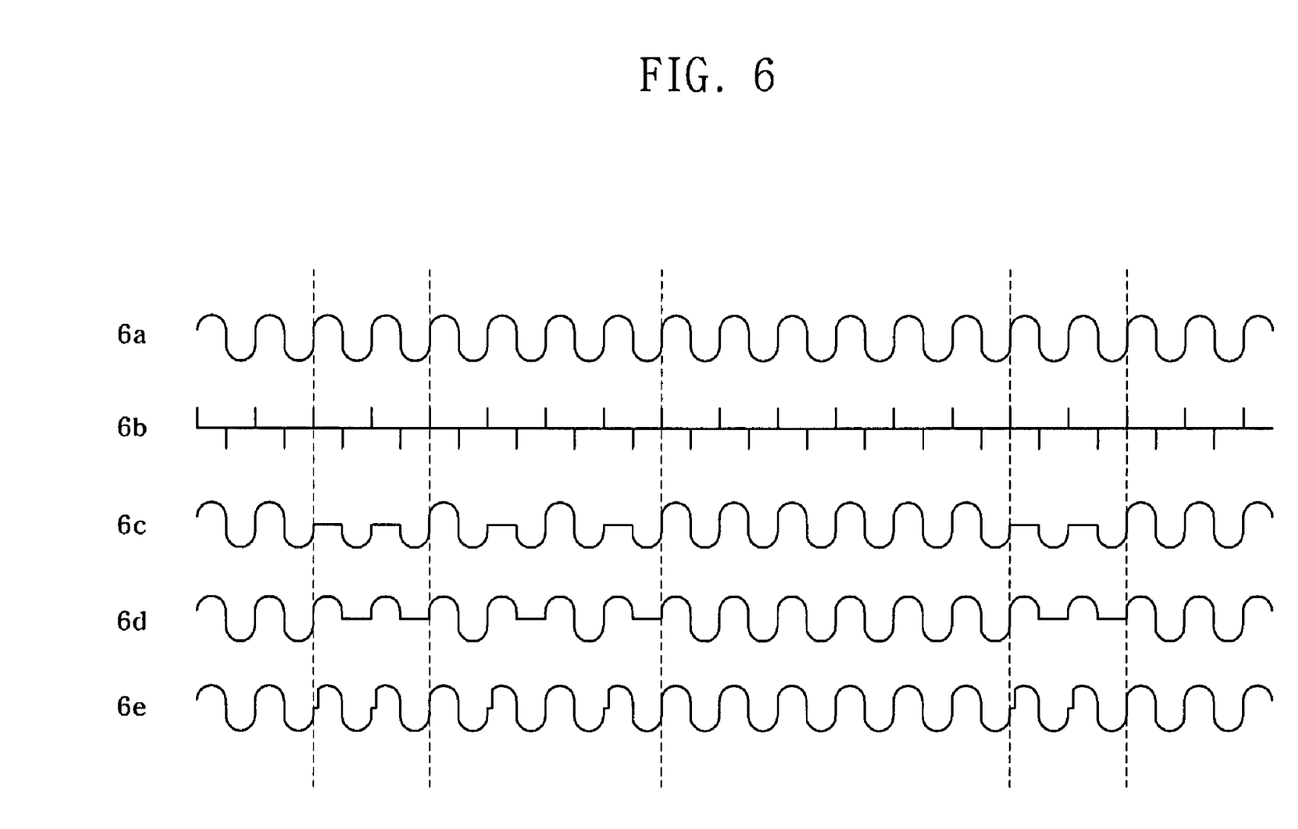
FIG. 6 illustrates examples of phase control of domestic AC power performed by the power control unit.

FIG. 6 illustrates examples of phase control of domestic AC power performed by the power control unit 200.

Referring to FIG. 6, a power control message corresponding to a power control signal is assumed to take 14 cycles of AC power in total.

In this case, a power control message is assumed to take 2 cycles for start information, 4 cycles for device address information, 6 cycles for control command, and 2 cycles for end information.

As shown by 6a of FIG. 6, the domestic AC power has a waveform that repeats with a period of $2a$ radians or 360 degrees. During an interval of 0 to 180 degrees (0 to $\pi$ radians, referred to as a first half cycle), the polarity is positive; and during an interval of 180 to 360 degrees ($\pi$ to $2\pi$ radians, referred to as a second half cycle), the polarity is negative. The AC power is an AC signal having a frequency of 50-60 Hz.

When the AC power has a frequency of 60 Hz, a full cycle (0 to 360 degrees) corresponds to 1.66 ms (1/60 Hz), and a half cycle corresponds to 0.83 ms. Hence, the AC power cycles every 1.66 ms; and the first half cycle corresponds to a duration of 0-0.83 ms, and the second half cycle corresponds to a duration of 0.83~1.66 ms.

As such, power control messages can be generated by suitably controlling the phase and/or time of first and second half cycles of the AC power.

In one embodiment described below, it is assumed that a power control message is generated by controlling the phase of AC power. As shown by 6c of FIG. 6, a power control message is assumed to control the positive part of the AC power.

When a control message is received through the wireless communication unit 230, the controller 210 analyzes the received control message to identify a device selected by the user and an issued operation control command.

Thereafter, the controller 210 generates a power control signal sequentially including start information, device address information, control command and end information at the time of generation of zero-cross detection signals from the zero-crossing detector 260.

The controller 210 generates a power control signal for controlling the phase of the AC power so as to reduce impact on the AC power.

This is because the AC power is used as operating power for the devices 301 to 30n. That is, the power control message causes phase control or phase shift of the AC power as shown by 6c of FIG. 6, affecting the operating power.

Hence, the device address information and the control command of the power control signal are coded so as to distribute phase-shifted cycles in corresponding intervals of the AC power.

For example, when '0' indicates performance of phase control of the AC power and '1' indicates non-performance of phase control, values such as "0000" and "000000" are not used. The number of '0's is preferably kept small and '0's are preferably nonconsecutive for stable supply of the operating power because the AC power to be phase-shifted is used as operating power for the devices 301 to 30n.

Further, the device address information of the power control signal can be coded using 1111, 1110, 1101, 1011, 0111, 1010, 0101, 1001, 1100, 0110, 0011, 0100, 0010, 1000 and 0001. The device address information can be assigned to devices in order of control frequency (1111 to the most frequently controlled device).

Thereby, phase control based on the power control message reduces impact on the AC power supplied as operating power to the devices 301 to 30n.

To further reduce impact on the AC power, as shown by 6e of FIG. 6, phase control is performed in units of a ⅟16 to ¼ cycle interval (1.04~4.16 ms) in consideration of electric power supply.

The controller 210 generates power control signals satisfying the conditions described above.

When a power control signal is generated, the phase controller 270 performs phase control of the AC power (6a of FIG. 6) to generate a phase-shifted AC power according to the power control signal, and outputs the phase-shifted AC power (6c of FIG. 6) to the power line.

Hence, when generating a zero-cross detection signal, the controller 210 generates a power control signal corresponding to a preset interval of the AC power (14 cycles in 6c of FIG. 6). The phase controller 270 generates a power control message and supplies the same to the power line by passing or blocking the positive part of the cycles at the time of polarity reversal from positive to negative according to the power control signal, as shown by 6c of FIG. 6.

The power control message shown by 6c of FIG. 6 carries a command "turn on device 1010."

Power control messages are illustrated in Table 4. It is assumed that the device having device address information of 1010 requires control commands for power-on/off and the device having device address information of 0101 is a device requiring control commands for power-on/off and operation steps (for example, a light fixture with dimming control).

TABLE 4

| Device address | Control command | Description |
|---|---|---|
| 1010 | 111111 | turn on device 1010 |
| 1010 | 011111 | turn off device 1010 |
| 0101 | 111111 | turn on device 0101 |
| 0101 | 011111 | turn off device 0101 |
| 0101 | 101110 | turn on device 0101 and set brightness to step 1110 |
| 0101 | 100101 | turn on device 0101 and set brightness to step 0101 |
| — | — | — |

In Table 4, '0' may indicate performing phase control of a corresponding cycle of the AC power.

Phase control may be performed on one of the positive part of the AC power (6c of FIG. 6), the negative part thereof (6d of FIG. 6), and a preset phase interval of the positive and negative parts thereof (6e of FIG. 6).

The power control message shown by 6c of FIG. 6 is transmitted through the power line to the devices 301 to 30n. Each of the devices 301 to 30n receives the power control message on the power line and checks the device address information of the power control message. Then, one of the devices 301 to 30n having a device address corresponding to the device address information analyzes the control command present in the power control message and performs an operation according to the control command.

The devices 301 to 30n can be grouped according to control mode into devices capable of performing solely a power-on/off operation, devices operable stepwise, and devices both capable of performing a power-on/off operation and operable stepwise. The devices 301 to 30n must have device address information as unique identification information, and individual control command tables according to control modes.

Figure 7A:
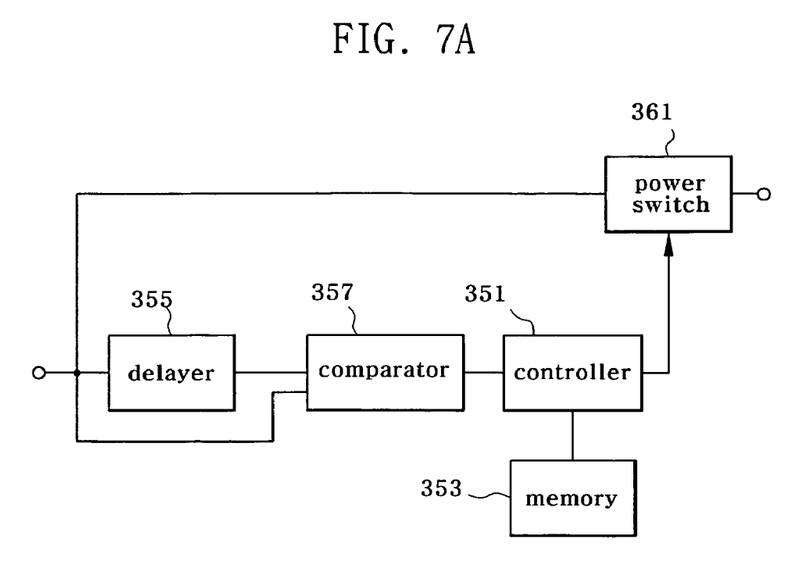
FIGS. 7a and 7b are block diagrams of devices shown in FIG. 3.
Figure 7B:
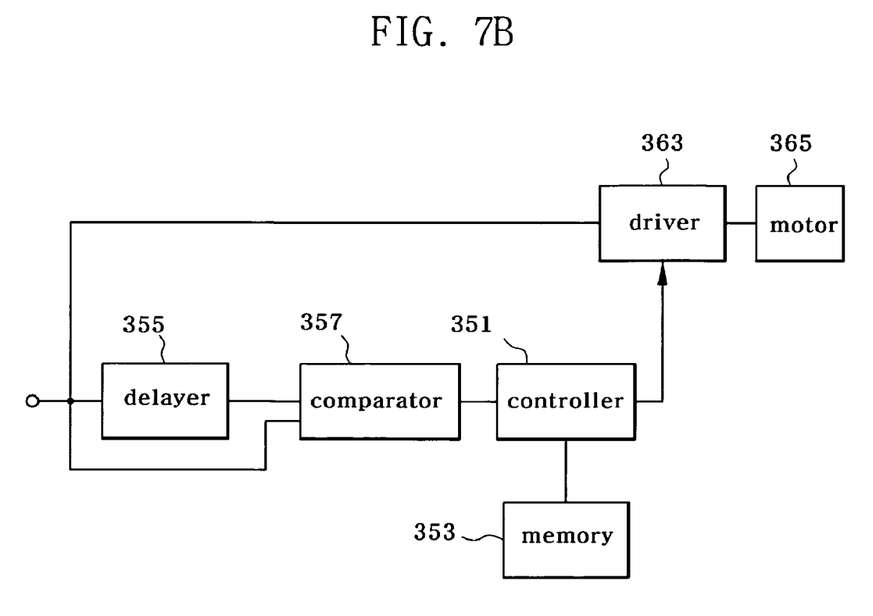

FIG. 7a is a block diagram illustrating a device capable of performing solely a power-on/off operation, and FIG. 7b is a block diagram illustrating a device operable stepwise. Referring to FIGS. 7a and 7b, each of devices 301 to 30n includes a delayer 355 and comparator 357 for detecting a power control message on the power line, a memory 353 for storing unique identification information and a control command table, and a controller 351 for analyzing a detected power control message to compare identification information with the device address information of the power control message and for controlling the operation of the device if the identification information is equal to the device address information.

The delayer 355 is connected to the power line and delays the phase of the AC power. Preferably, the phase delay is set to 90 or 180 degrees. The comparator 357 takes the phase-delayed AC power from the delayer 355 and a normal AC power as input and compares them with each other.

When the AC power is phase-shifted owing to a power control message, the comparator 357 generates a pulse signal at a corresponding cycle of the AC power. That is, the delayer 355 and comparator 357 detect a phase-shifted power control message on the power line.

The delayer 355 may be replaced with an advancer, which phase-advances the AC power by a preset phase angle. If replaced, the comparator 357 generates a comparison signal in the same manner as the case where the delayer 355 is used.

The controller 351 analyzes the power control message from the comparator 357 using information stored in the memory 353, and controls the operation of an associated device connected to the controller 351 in response to the power control message addressed thereto.

If the addressed device is capable of performing solely a power-on/off operation, the controller 351 controls a power switch 361 to turn on or off the device. If the addressed device is both capable of performing a power-on/off operation and operable stepwise, the controller 351 controls a driver 363 to drive a motor 365 so as to perform an operation according to the control command of the power control message.

According to the embodiments of the present invention described above, the user can control the operation of household devices through a remote controller from inside or outside the home, and can also remotely control the operation of the household devices connected to the power line through controlling the phase of AC power supplied to the devices.

Figure 8:
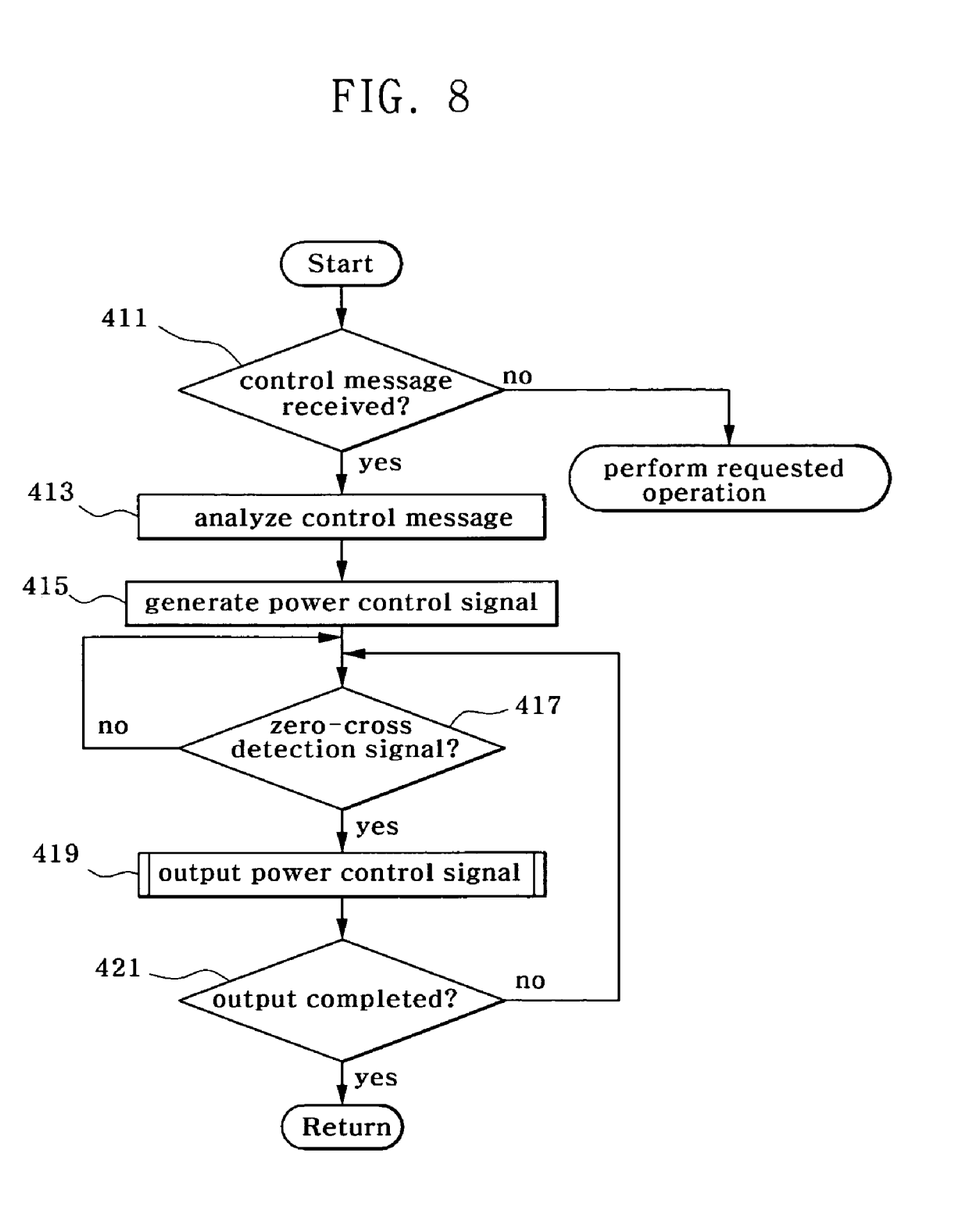
FIG. 8 is a flow chart illustrating a procedure for generating a power control message in a device control method according to some embodiments of the present invention.
Figure 9:
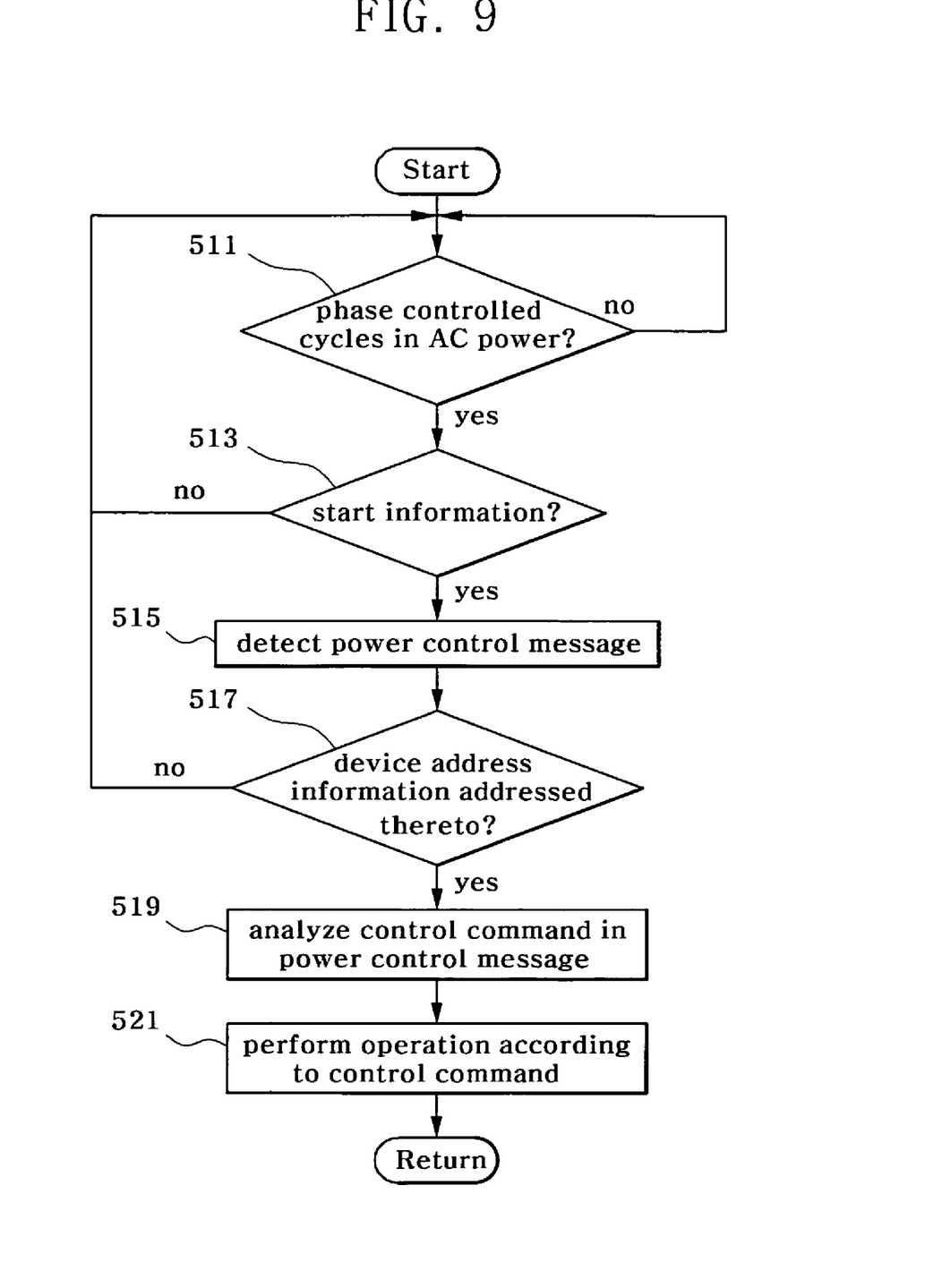
FIG. 9 is a flow chart illustrating a procedure for controlling the operation of devices connected to the power line according to the power control message according to some embodiments of the present invention.

FIG. 8 is a flow chart illustrating a procedure for generating a power control message and applying the power control message to the power line by the power control unit 200, and FIG. 9 is a flow chart illustrating a procedure for controlling the operation of devices connected to the power line according to the power control message.

Referring to FIG. 8, the controller 210 of the power control unit 200 determines whether a control message from the remote controller 100 is received (step 411). If a control message is received, the controller 210 analyzes the received control message (step 413).

The control message includes device address information and control command information as shown in Table 2.

The controller 210 generates a power control signal using the device address information and control command information to produce a power control message (step 415). The power control signal can have a format illustrated in Table 3.

Thereafter, the controller 210 determined whether a zero-cross detection signal is generated from the zero-crossing detector 260 (step 417). If a zero-cross detection signal is generated, the controller 210 outputs a portion of the power control signal to the phase controller 270 in a manner synchronized with the output of the zero-crossing detector 260 (step 419).

The controller 210 determines whether the output of the power control signal is completed (step 421). If the output of the power control signal is not yet completed, the controller 210 returns to step 417, and otherwise ends the procedure.

FIG. 9 is a flow chart illustrating a procedure for controlling the operation of devices 301 to 30n according to a power control message.

Referring to FIG. 9, the controller 351 of each of the devices 301 to 30n decodes the AC power carried by the power line to determine the presence of phase-shifted cycles in the AC power (step 511). If phase-shifted cycles are present, the controller 351 checks whether the phase-shifted cycles correspond to start information (step 513).

At step 513, if the number of phase-shifted cycles is greater than or equal to a preset value, the controller 351 regards the phase-shifted cycles as start information of a power control message.

In FIG. 6, two consecutive phase-shifted cycles of the AC power are regarded as the start of a power control message.

If start information is detected, the controller 351 determines that a power control message is detected, and decodes a preset number of cycles of the AC power after the start cycles into device address information (step 515). The controller 351 determines whether the device address information is equal to the identification information of the controller 451 (step 517).

In FIG. 6, device address information following the start information takes 4 cycles of the AC power.

The controller 351 can extract device address information of the power control message by decoding 4 cycles of the AC power after the start cycles, and compares the extracted device address information with its own identification information stored in the memory of the controller 351 to determine whether they are equal.

If the device address information is not equal to the identification information of the controller, the controller 351 determines that the power control message is not directed thereto and returns to step 511 for the next power control message.

If the device address information is equal to the identification information of the controller, the controller 351 determines that the power control message is directed thereto, and decodes a number of cycles of the AC power after the device address cycles into a control command (step 519).

Control commands can take a variable number of cycles depending upon their length.

The controller 351 controls the operation of the device according to the decoded control command.

Here, the addressed device can be turned on or turned off, or the motor 365 can be driven.

As described above, each of the devices 301 to 30n analyzes a power control message on the power line and performs an operation according to a control command present in the power control message if the power control message is addressed thereto.

As apparent from the above description, according to the present invention, data can be transmitted and received in a manner robust against noise and impedance during power line communication by controlling the phase of AC power with reference to a zero cross point.

Further, according to the present invention, data can be received by detecting a phase change in AC power with reference to a zero cross point, thereby enabling miniaturization of a receiver.

Further, according to the present invention, the power and operation of household devices can be controlled through a power line communication apparatus, which eliminates the need to install a separate communication network.

Further, according to the present invention, a user can control operation of household devices by making a call from a remote location with a telephone having a wireless communication unit for generating a remote control signal, with a power line communication apparatus connected to the household devices.

Moreover, according to the present invention, data can be transmitted and received without significant power loss, so that the operation of devices can be controlled efficiently.

The present invention has been disclosed for illustrative purposes with reference to the embodiments shown in the drawings. Those skilled in the art will appreciate that various modifications, additions and substitutions are possible from the above description. Therefore, the scope of the invention should be determined by the accompanying claims.

What is claimed is:

1. A device control apparatus for controlling devices connected to a power line, comprising:
   a power control unit generating a control message to control a device connected to a power line according to a user selection, and generating a power control message including device address information and a control command by controlling a phase of AC power carried by the power line; and a plurality of devices, each performing an operation according to the control command of the power control message in response to the power control message addressed thereto, wherein the power control unit generates the power control message by controlling the phase of the AC power by turning off the AC power between $\frac{1}{16}$ and $\frac{1}{4}$ of at least one of a positive-polarity half cycle and a negative-polarity half cycle of the AC power to cut the phase of the AC power; and the device connected to the power line comprises:
- a delayer delaying the phase of the AC power carried by the power line;
- a comparator comparing the phase-delayed AC power to a normal-phase AC power; and
- a controller analyzing an output from the comparator to detect the power control message and controlling an operation of the device according to the control command of the power control message in response to the device address information of the detected power control message addressed to the device.

2. The device control apparatus according to claim 1, wherein the power control unit comprises:
- a zero-crossing detector detecting a zero cross point of the AC power;
- a controller analyzing the control message and outputting a power control signal in a manner synchronized with an output of the zero-crossing detector, the power control signal comprising device selection information for power control and operation control information for a selected device; and
- a phase controller controlling the phase of the AC power carried by the power line according to the power control signal to output the power control message to the power line.

3. The device control apparatus according to claim 1, wherein the power control message comprises:
- start information indicating an initiation of the power control message;
- device address information indicating the device to be controlled;
- a control command controlling an operation of the device to be controlled; and
- end information indicating an end of the power control message.

4. A method of controlling devices connected to a power line, comprising:

generating a control message to control a device connected to a power line according to a user selection;

generating a power control message including device address information and a control command by analyzing the control message and controlling a phase of AC power carried by the power line, wherein the controlling of the phase of AC power comprises turning off the AC power between $\frac{1}{16}$ and $\frac{1}{4}$ of at least one of a positive-polarity half cycle and a negative-polarity half cycle of the AC power to cut the phase of the AC power;

analyzing the power control message in a plurality of devices connected to the power line; and controlling at least one of the devices to perform an operation according to the control command of the power control message in response to the device address information of the power control message addressed thereto;

wherein the analyzing of the power control message comprises:
- delaying the phase of the AC power carried by the power line;
- comparing the phase-delayed AC power to a normal-phase AC power; and
- determining whether the power control message has been generated through analysis of the comparison result, followed by performing the operation by the associated device according to the control command of the power control message in response to the device address information of the power control message addressed thereto.

5. The method according to claim 4, wherein the generating of the power control message comprises:
- analyzing the control message and synchronizing a power control signal with a zero-cross detection signal, the power control signal comprising device selection information for power control and control information for a selected device; and
- outputting the power control message to the power line by controlling the phase of the AC power carried by the power line according to the power control signal.

6. The method according to claim 4, wherein the power control message comprises:
- start information indicating an initiation of the power control message;
- device address information indicating the device to be controlled;
- a control command controlling an operation of the device to be controlled; and
- end information indicating an end of the power control message.

* * * * *